United States Patent
Goodman et al.

(10) Patent No.: US 7,515,407 B2
(45) Date of Patent: Apr. 7, 2009

(54) VIBRATION DAMPING CARRIER FOR A DISK DRIVE

(75) Inventors: Walter Adrian Goodman, Cary, NC (US); Kenton Coleman Green, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 11/781,762

(22) Filed: Jul. 23, 2007

(65) Prior Publication Data

US 2009/0031334 A1    Jan. 29, 2009

(51) Int. Cl.
*G06F 1/16*    (2006.01)

(52) U.S. Cl. .................... 361/685; 312/223.1; 248/634; 360/97.01

(58) Field of Classification Search ... 312/223.1–223.2; 360/97.01–97.03, 97.08; 248/603–604, 638, 248/917; 206/433, 521, 586, 521.6, 521.7; 267/136, 141, 153; 361/679–687, 724–727

See application file for complete search history.

(56) References Cited

U.S. PATENT DOCUMENTS

| | | | |
|---|---|---|---|
| 7,012,805 B2 * | 3/2006 | Shah et al. | 361/685 |
| 7,251,131 B2 * | 7/2007 | Shah et al. | 361/685 |
| 7,342,780 B2 * | 3/2008 | Scicluna et al. | 361/685 |
| 2005/0237707 A1 | 10/2005 | Connelly, Jr. et al. | |

* cited by examiner

*Primary Examiner*—Hung V Duong
(74) *Attorney, Agent, or Firm*—Cynthia S. Byrd; Jeffrey L. Streets (57) ABSTRACT

A vibration damping carrier for a disk drive. The carrier may be made of plastic and includes a pair of flexible rails securable to mounting holes in a raised pad on opposing sides of a disk drive housing. Each flexible rail secures one or more sets of a spring and a protuberance in transverse alignment with the spring. Each spring is outwardly extending for engaging opposing walls of a chassis bay and each protuberance is inwardly extending into engagement with the rigid housing. When the disk drive housing and flexible rails are positioned within the chassis bay, each spring and protuberance set is transversely compressed. Typically, the disk drive housing and the chassis bay are rectangular such that the spring and protuberance are transversely compressed. The protuberances provide localized reinforcement of the rails and prevent any significant flexing from occurring.

20 Claims, 7 Drawing Sheets

FIG. 8

VIBRATION DAMPING CARRIER FOR A DISK DRIVE

BACKGROUND

1. Field of the Invention

The present invention is related to carriers or trays for positioning a disk drive in a chassis bay and damping vibrations relative to the disk drive.

2. Background of the Related Art

Hard disk drives include a storage disk that is rotationally mounted to a main body or housing. For example, a disk mounted horizontally will rotate about a vertical axis. A disk head is also mounted to the housing for controllably tracking across the disk to desired positions. The movements of the disk and the disk head are combined into "seek operations" in which the disk head can read data from the disk or write data onto the disk.

However, the actuators that rotate the disk or reposition the disk head cause vibrations throughout the disk drive and its housing. These vibrations can cause read/write errors, write inhibits, or simply reduce the speed or other performance characteristic of the disk drive. The source of the vibration may include an out-of-balance disk stack or the rapid acceleration and deceleration of the disk head actuator.

These vibrations can certainly cause problems within a single hard drive, but the vibrations can also be transmitted to other adjacent hard drives and induce problems in those drives. Typically, vibrational forces are transmitted from one drive to another through the common enclosure or chassis that supports and secures the drives. One conventional approach to limiting the transmission of vibrational forces is to make the chassis stiff so that the entire mass of the chassis and its components oppose the vibrational forces through the principle of conservation of momentum.

Still, designing a completely stiff system is complicated by the commercial practicality of making the disk drive easily removable from the chassis bay. Therefore, a system integrator must design system cabinets and disk drive mounting hardware that mitigates vibration while accommodating maintenance and upgrading of hard drives. The mounting hardware is preferably simple and inexpensive, but many designs have failed. For example, simple plastic mounting systems have failed to mitigate the high levels of vibrations produced by a hard drive.

Therefore, there remains a need for improved disk drive mounting systems that are simple and inexpensive, while mitigating a suitable degree of vibration. The mounting system should accommodate installation and removal of the disk drive without requiring complicated and laborious procedures.

SUMMARY OF THE INVENTION

One embodiment of the present invention provides a vibration damping carrier for a disk drive. The carrier comprises a pair of flexible rails securable to mounting holes in a raised pad on opposing sides of a disk drive housing. Each flexible rail secures one or more sets of a spring and a protuberance in transverse alignment with the spring. Each spring is outwardly extending for engaging opposing walls of a chassis bay and each protuberance is inwardly extending from the flexible rail into engagement with the rigid housing outside the raised pad. Accordingly, when the disk drive housing and flexible rails are positioned within the chassis bay, each of the sets of a spring and protuberance are transversely compressed. In one embodiment, the protuberance extends inwardly a distance that is substantially equal to the height of the raised pad. Preferably, the protuberance has a substantially flat surface for engaging the rigid housing. It is also preferred that the protuberance has an aspect ratio of height to width that is less than 0.5.

Another embodiment of the invention provides a vibration damping disk drive assembly. The assembly comprises a disk drive unit having a planar disk that rotates within the plane during operation and causes vibration within the plane. The planar disk is rotationally secured to a rigid disk drive housing having opposing walls that extend along opposing edges of the planar disk, each of the opposing walls having a raised pad with at least one mounting hole. A pair of flexible rails is secured to the mounting holes on opposing sides of the disk drive housing, wherein each flexible rail secures one or more sets of a spring and a protuberance in transverse alignment with the spring. Each spring is outwardly extending for engaging opposing walls of a chassis bay and each protuberance is inwardly extending from the flexible rail into engagement with the rigid housing outside the raised pad. Accordingly, when the disk drive housing and flexible rails are positioned within the chassis bay, each of the sets of a spring and protuberance are transversely compressed.

DETAILED DESCRIPTION

One embodiment of the present invention provides a vibration damping carrier for a disk drive. The carrier comprises a pair of flexible rails securable to mounting holes in a raised pad on opposing sides of a disk drive housing. Each flexible rail secures one or more sets of a spring and a protuberance in transverse alignment with the spring. Each spring is outwardly extending for engaging opposing walls of a chassis bay and each protuberance is inwardly extending from the flexible rail into engagement with the rigid housing outside the raised pad. Accordingly, when the disk drive housing and flexible rails are positioned within the chassis bay, each of the sets of a spring and protuberance are transversely compressed.

Prior art disk drive carriers had to be extremely stiff in order to reduce the amount of vibration from the disk drive that would be transmitted to the chassis and other components in the chassis. The carriers of the present invention do not have to be stiff, because the transverse alignment of the spring and protuberance position these components in compression between the disk drive housing and the chassis bay wall.

Typically, the disk drive housing and the chassis bay will both be rectangular such that the spring and protuberance are transversely compressed along a line substantially perpendicular to both the disk drive housing and the chassis bay wall.

The raised pads on the opposing sides of the disk drive housing are generally aligned in a common plane to receive linear rails. The mounting holes in the raised pads typically secure the rails directly against the pad, such as using a small bolt. Since these rails are received against the raised pad, a truly planar rail would span between portions of the raised pad without contacting the rest of the housing wall. The protuberances extend inwardly of the rails to make direct contact with the wall of the disk drive housing outside the raised pad. In particular, the protuberances are transversely aligned with each spring and cooperate with each spring and each rail to enable localized reinforcement of the rails directly opposite the springs. When the disk drive unit and carrier assembly are installed in a chassis bay, the springs are compressed without any significant flexing of the rails. In this manner, the rails may be made of a flexible material because the alignment of the springs and protuberances prevents any significant flexing from occurring.

In a further embodiment, each protuberance extends inwardly a distance that is substantially equal to the height of the raised pad. Where the rails and the housing are parallel, making each protuberance the same height as the raised pad will put each protuberance in direct contact with the housing wall as soon as the rails are attached. During installation when the springs are compressed, the rail and protuberances are immediately placed in compression without any significant transverse displacement or flexing of the rail.

Preferably, the protuberance has a substantially flat surface for engaging the rigid housing. Since the protuberance is intended to reinforce the spring and prevent localized flexing of the rails behind the spring, a substantially flat surface provides the protuberance with a greater effective amount of cross-sectional area along the line of transverse compression. Accordingly, the compressive forces are spread over a greater effective cross-sectional area to provide the necessary localized stiffness using plastics and other materials that are typically flexible. Furthermore, it is also preferred that each protuberance have an aspect ratio of height-to-width that is less than 0.5.

The springs may be any of the various known types of springs, but are preferably leaf springs because they can be easily designed to withstand frictional forces during insertion and withdrawal of the disk drive and carrier assembly relative to the chassis bay. Furthermore, the springs may be attached to the rails with fasteners, such as small bolts, most preferably the same fasteners or bolts that secure the rails to the disk drive housing. Alternatively, a leaf spring may be secured to a rail by flexing the leaf spring, inserting the ends of the flexed leaf spring into appropriately spaced cavities within the rail, and releasing the leaf spring.

Each spring must be aligned with a protuberance in order to achieve the compression and stiffness necessary to mitigate vibration. Preferably, the protuberance is aligned with the center of each leaf spring. Alternatively, a protuberance may be aligned with each end of the leaf spring in order to provide an even greater stiffness.

In a preferred embodiment, the pair of flexible rails is connected by a strap, most preferably at the distal end that will lead into the chassis bay. In addition, the pair of flexible rails each have a proximal end that includes a finger loop that remains accessible after the hard disk unit and carrier assembly have been installed within a chassis bay. The finger loop, or other handle design, facilitates handling of the assembly.

When the side walls of the chassis bay include tracks, the flexible rails are dimensioned to be securely received within those tracks. Optionally, the distal end of each flexible rail may narrow slightly to assist initial entry of the rail into the corresponding track. In a further option, the flexible rails may include a centralizing feature to center the rail within the track.

An additional beneficial feature of the flexible rails is an inwardly extending pin that is aligned with a mounting hole along one of the opposing sides of the disk drive housing. The pin is sized to be received within the mounting hole and provide support for maintaining the flexible rail in alignment with the housing without the use of an additional fastener. However, using a pin instead of a fastener is only preferable when each side of the housing has three or more mounting holes, such that a pair of fasteners will still be used. Most preferably, the pin is formed in a position along the rail to align with an intermediate mounting hole and fasteners will be used at the most distal and most proximal mounting holes on each side of the housing.

The carrier of the invention secures and mitigates vibration from a disk drive unit when secured to the disk drive as described above. A typical disk drive unit has a planar disk that rotates within the plane during operation and causes vibration within the plane. The planar disk is rotationally secured to a rigid disk drive housing having opposing walls that extend along opposing edges of the planar disk, each of the opposing walls having a raised pad with at least one mounting hole.

Another embodiment of the invention provides a vibration damping disk drive assembly. The assembly comprises a disk drive unit having a rigid disk drive housing with opposing walls, wherein each of the opposing walls have a raised pad with at least one mounting hole. A pair of flexible rails are secured to the mounting holes on opposing sides of the disk drive housing, wherein each flexible rail secures one or more sets of a spring and a protuberance in transverse alignment with the spring. Each spring is outwardly extending for engaging opposing walls of a chassis bay and each protuberance is inwardly extending from the flexible rail into engagement with the rigid housing outside the raised pad. Accordingly, when the disk drive housing and flexible rails are positioned within the chassis bay, each of the sets of a spring and protuberance are transversely compressed.

Figure 1:
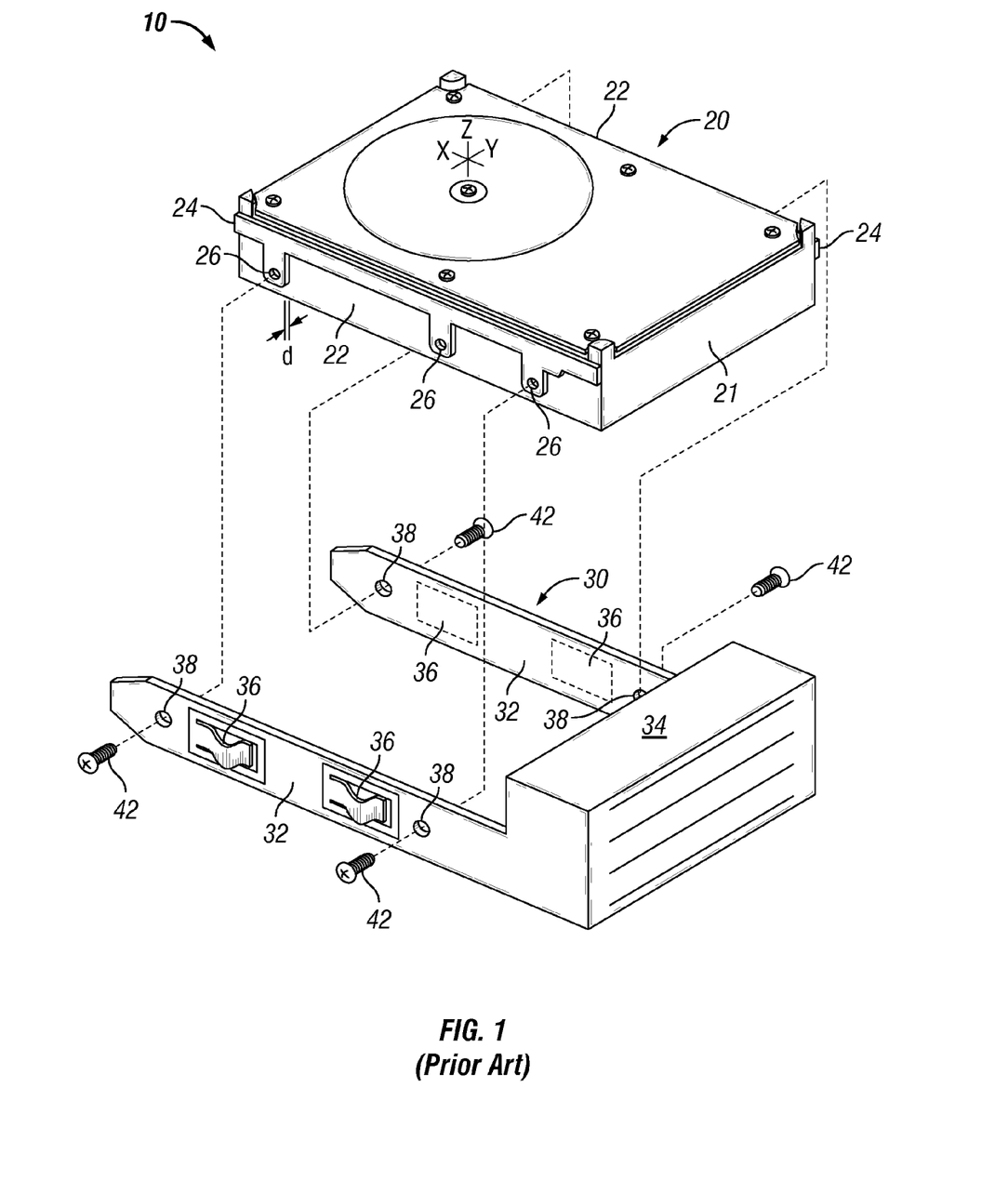
FIG. 1 is a perspective assembly diagram of a prior art disk drive assembly.

FIG. 1 is a perspective assembly diagram of a prior art disk drive assembly 10. The assembly 10 includes a disk drive unit 20 and a carrier 30 that is securable to the disk drive. A typical disk drive unit 20 has a generally rectangular housing 21 with opposing side walls 22. Each of the opposing side walls 22 has a raised pad 24 that includes three mounting holes 26. The pad 24 is raised about 0.015 inch from the regions 28 of the rigid housing wall 22 that are outside of the area of the pad. Inside the housing 21 is a generally planar disk (not shown) that rotates about an axis Z and the vibrational forces caused by operation of the disk drive are generally directed within the plane of the disk which is parallel to the X-Y plane.

The carrier 30 provides a rigid metal bracket having a pair of think metal side rails 32 connected together at a proximal end by an assembly 34 that may include various latches and air vents (not shown) to facilitate handling and operation of the carrier 30 when it is attached to hard disk unit 20. The carrier 30 is sized to fit around the disk drive unit 20 with the opposing rails 32 running along the opposing raised pads 24. Each rail 32 includes two holes 38 that are positioned to align with the proximal and distal mounting holes 26 on the opposing sides of the disk drive housing. As shown, each of the holes 38 in the carrier rails 32 receive a bolt 42 that is threadably received in the proximal and distal mounting holes 26. A pair of leaf springs 36 are provide on each rail 32 for engaging the wall of a chassis bay when the assembly 10 is installed.

Figure 2:
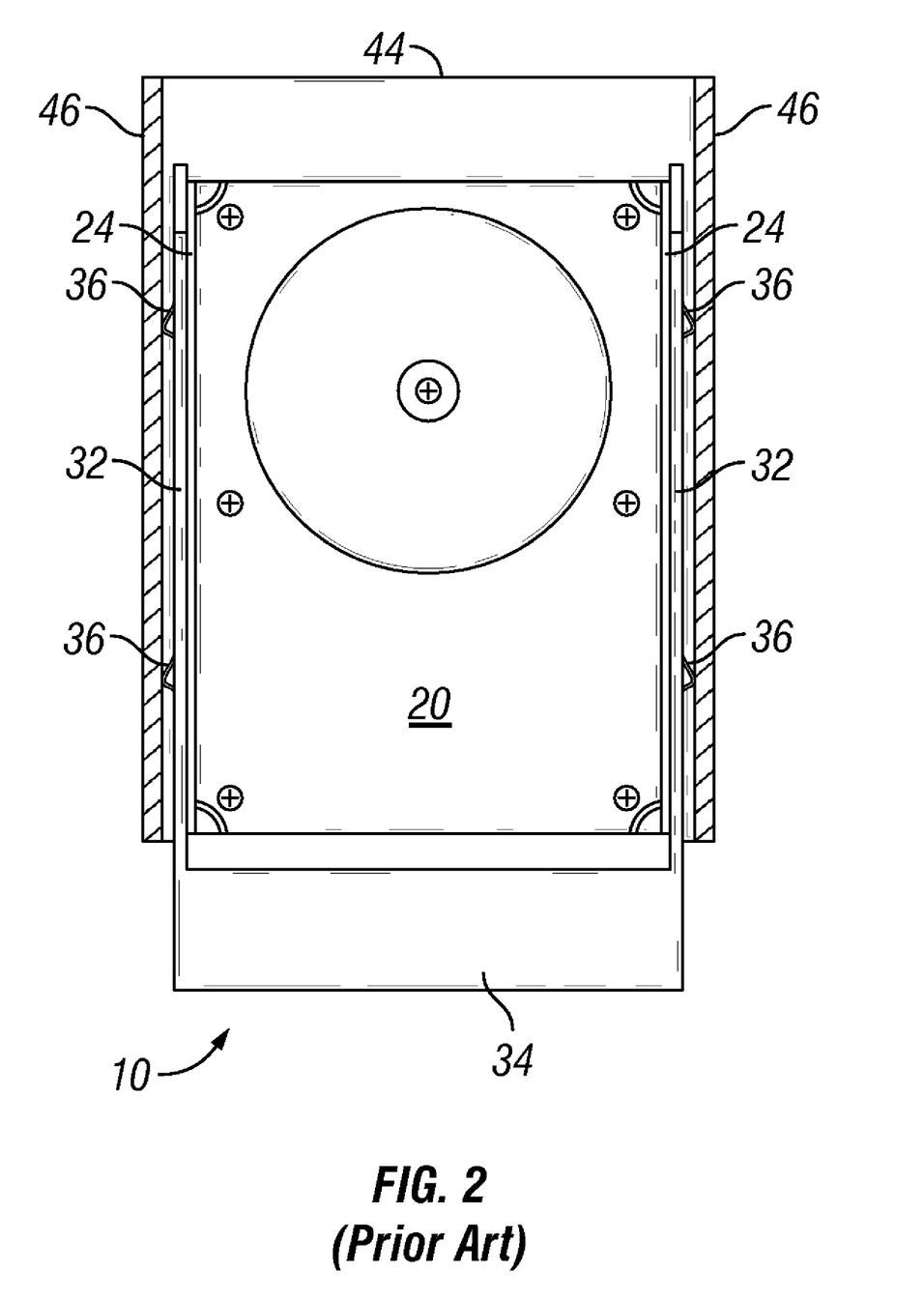
FIG. 2 is a top view of a prior art vibration damping disk drive assembly.

FIG. 2 is a top view of a prior art vibration damping disk drive assembly 10 installed in a chassis bay 44 having side walls 46. The leaf springs 36 engage the opposing side walls 46 of the chassis bay and hold the assembly 10 firmly in position. The stiffness of the thick metal rails 32 and the loading of the springs 36 against the chassis walls 46 reduce the transmission of vibration emanating from the disk drive unit 20.

Figure 3:
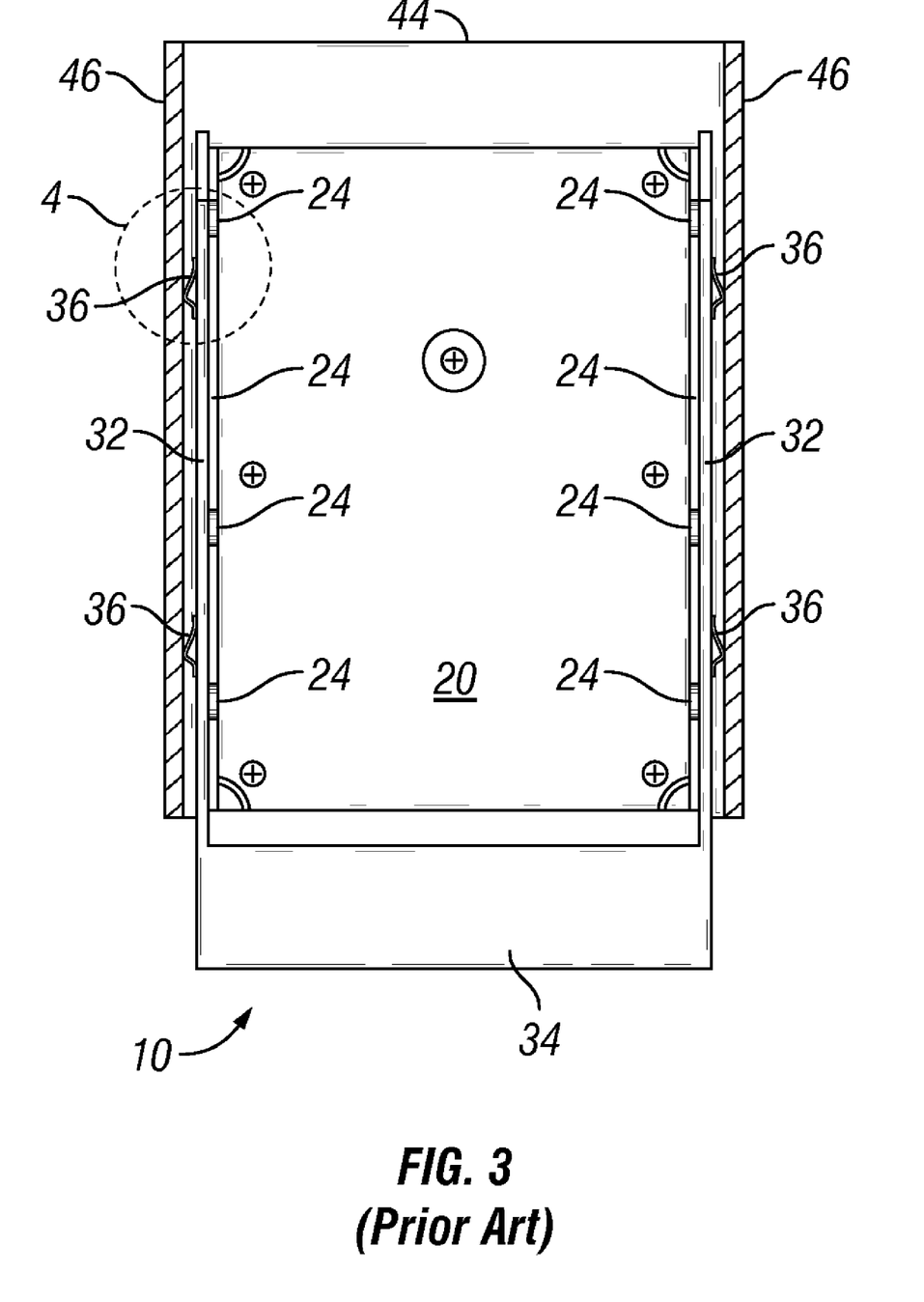
FIG. 3 is a bottom view of a prior art vibration damping disk drive assembly.

FIG. 3 is a bottom view of a prior art vibration damping disk drive assembly 10. The bottom view is substantially similar to the top view of FIG. 4 except that it highlights how the thick metal rails 32 must span between adjacent portions of the raised pad 24 and have sufficient stiffness to avoid flexing when the springs 36 apply a force against them.

Figure 4:
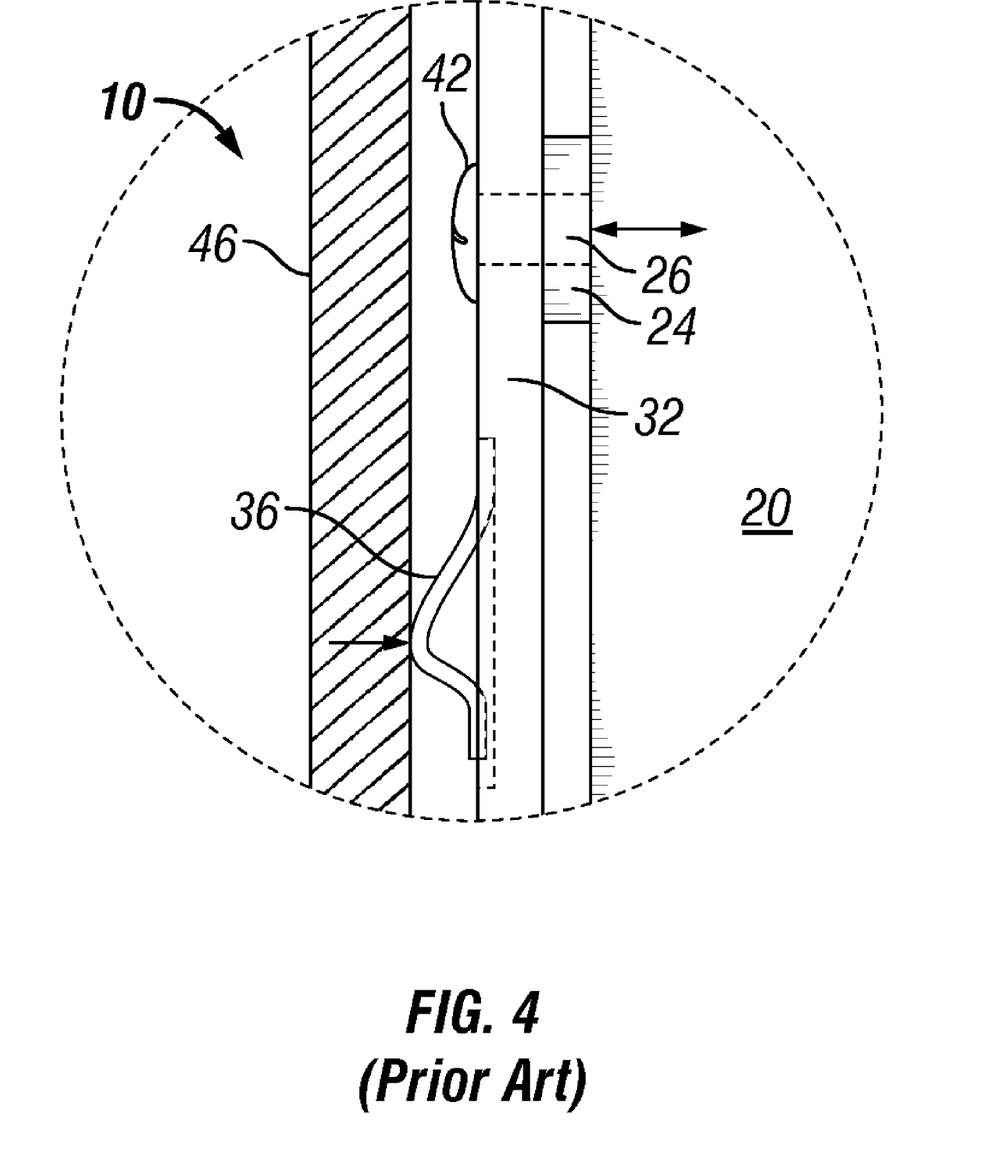
FIG. 4 is a partial bottom view of the prior art vibration damping disk drive assembly of FIG. 3 highlighting a leaf spring used for damping vibration from the hard disk drive.

FIG. 4 is a partial bottom view of the prior art vibration damping disk drive assembly 10 of FIG. 3 highlighting a single leaf spring 36 used for damping vibration from the hard disk drive 20. The leaf spring 36 is secured to the thick metal rail 32 that is secured to the mounting hole 26 in the raised pad 24. Because the spring is offset from the raised pad 24, the compression of the spring 36 applied a force against the rail 32 tending to flex the rail. The stiffness of the rail 32 is critically important to preventing the vibration of the disk drive unit 20 from transmitting through the pad 24, the rail 32 and the spring 36 to the chassis wall 46. Vibrational forces transmitted to the wall 46 can affect other disk drives, as well as the disk drive 20, shown.

Figure 5:
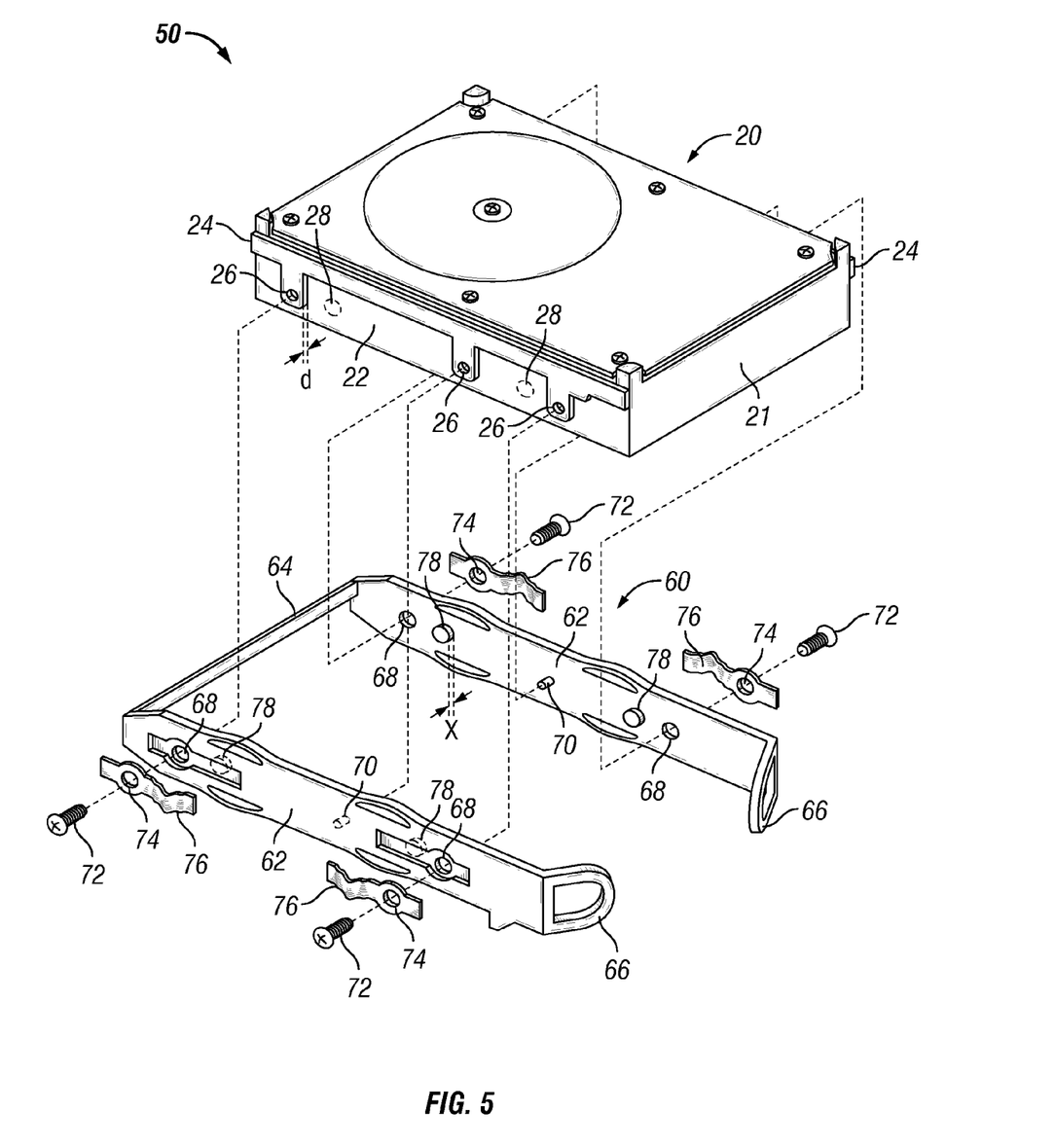
FIG. 5 is a perspective assembly diagram of a vibration damping disk drive assembly of the present invention.

FIG. 5 is a perspective assembly diagram of a vibration damping disk drive assembly 50 of the present invention. The disk drive unit 20 is identical to that described in reference to FIG. 1. The carrier 60 is made from a flexible material, preferably plastic, and has a pair of flexible side rails 62 connected together at a distal end by a strap 64 and having finger loops 66 at a proximal end to facilitate handling of the carrier when it is attached to hard disk unit 20. The carrier 60 is sized to fit around the disk drive unit 20 with the opposing rails 62 running along the opposing raised pads 24. Each rail 62 includes two holes 68 and an alignment pin 70 that are positioned to align with the three mounting holes 26 on the opposing sides of the disk drive housing. As shown, each of the holes 68 in the carrier rails 62 receive a bolt 72 that is threadably received in the proximal and distal mounting holes 26. The optional alignment pin 70 extends into the intermediate mounting hole 26 to support the flexible rail 62 without requiring an additional bolt. Furthermore, the bolt 72 passes through the eyelet 74 of the leaf spring 76 in order to secure the leaf spring to the carrier rails 62.

The flexible carrier rails 62 also include a protuberance 78 inwardly extending from the rails 62 and positioned in transverse alignment with each of the leaf springs 76. When the carrier rails 62 are secured to the disk drive unit 20 as described, the protuberances 78 engage the side walls 22 of the rigid disk drive housing 21 at points 28 outside the raised pad 24. The protuberances 78 preferably extend inwardly from the rails 32 a distance "d" that is substantially equal to the height of the raised pad 24. Accordingly, the protuberances 78 provide sufficient localized support for the leaf springs 76 so that substantial mitigation of the hard disk drive vibration is achieved.

Figure 6:
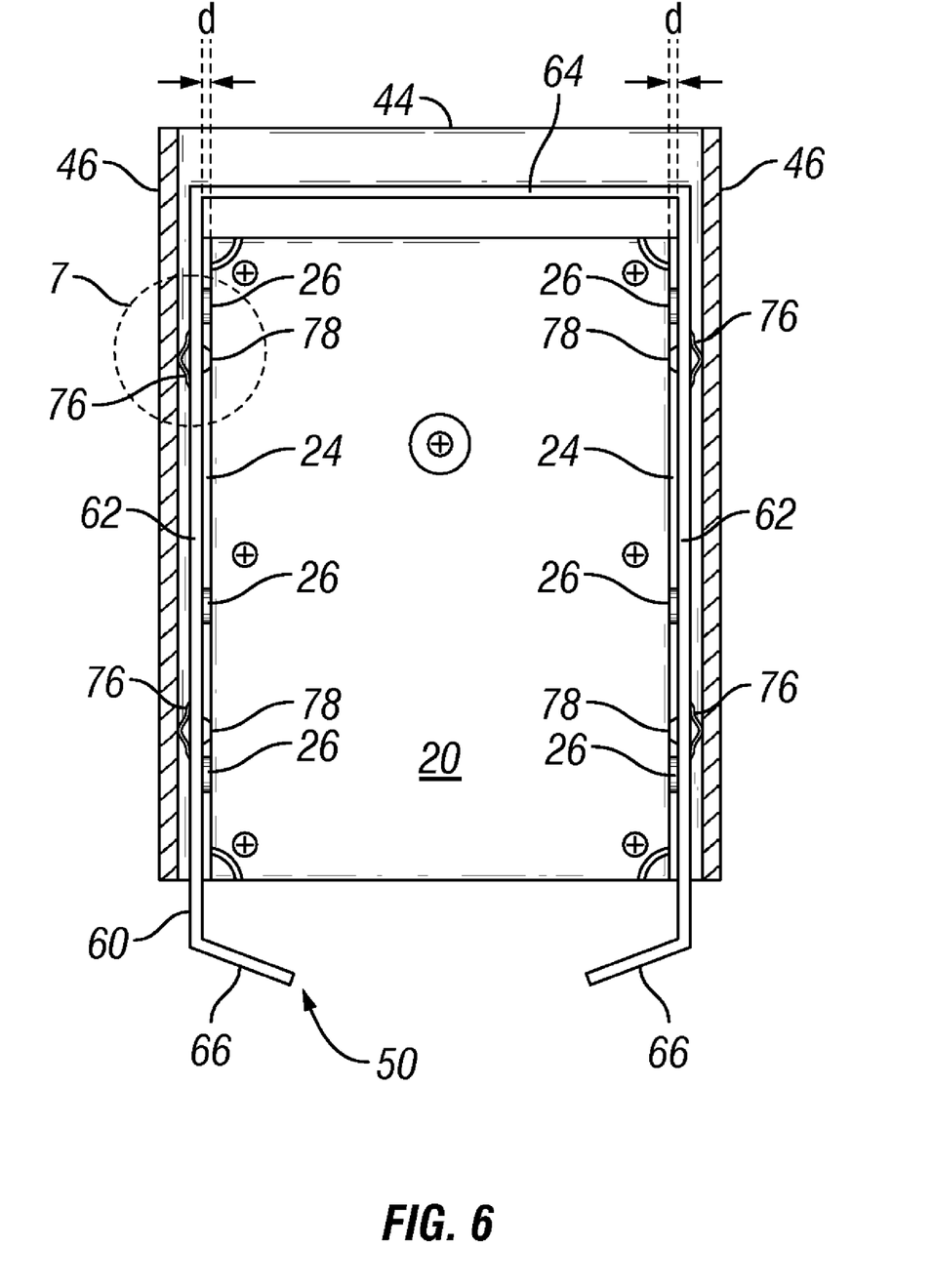
FIG. 6 is a bottom view of vibration damping disk drive assembly of the present invention.

FIG. 6 is a bottom view of the vibration damping disk drive assembly 50 of the present invention installed in a chassis bay 44 having side walls 46. The leaf springs 76 engage the opposing side walls 46 of the chassis bay and hold the assembly 50 firmly in position. As previously described in reference to FIG. 5, the carrier 60 includes the opposing flexible rails 62 connected at the distal end by the strap 64 and having finger loops 66 at the proximal end of each rail. The flexible rails 62 contact the raised pad 24 at the six points where a mounting hole 26 is provided. The protuberances 78 are aligned with the leaf springs 76 for compression between the walls of the disk drive unit 20 and the walls 46 of the chassis bay 44. As shown, the invention provides four such points for mitigating vibration of the disk drive unit 20. Accordingly, there is no longer a need for the rail to be stiff and the rail 63 can be made from a flexible material that is inexpensive to manufacture as rail or carrier. Most preferably, the entire carrier 60 is an integral piece of plastic. Suitable plastics are well-known in the art, but a preferred plastic is a blend of polycarbonate and acrylonitrile butadiene styrene (ABS).

Figure 7:
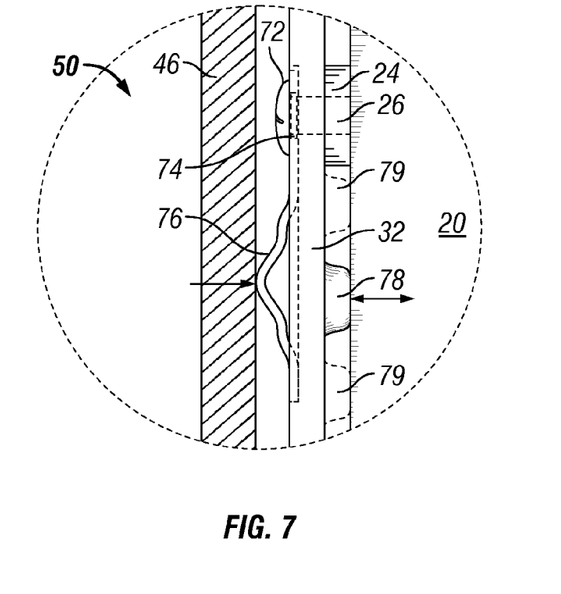
FIG. 7 is a partial bottom view of a vibration damping disk drive assembly of the present invention.

FIG. 7 is a partial bottom view of a vibration damping disk drive assembly 50 of the present invention taken from FIG. 6. This view highlights how the transverse alignment of the protuberance 78 and leaf spring 76 puts the protuberance in compression such that the rail is not subject to flexing. In an alternative arrangement, the protuberance 78 may be replaced with a pair of protuberances 79 (shown in dashed lines) aligned with the ends of the leaf spring 76 in order to provide even greater support of the rail 62 at the points where the leaf spring pushes against the rail. In either arrangement of the protuberances 78, 79, the carrier 60 provides the desired mitigation of vibration emanating from the disk drive unit 20.

Figure 8:
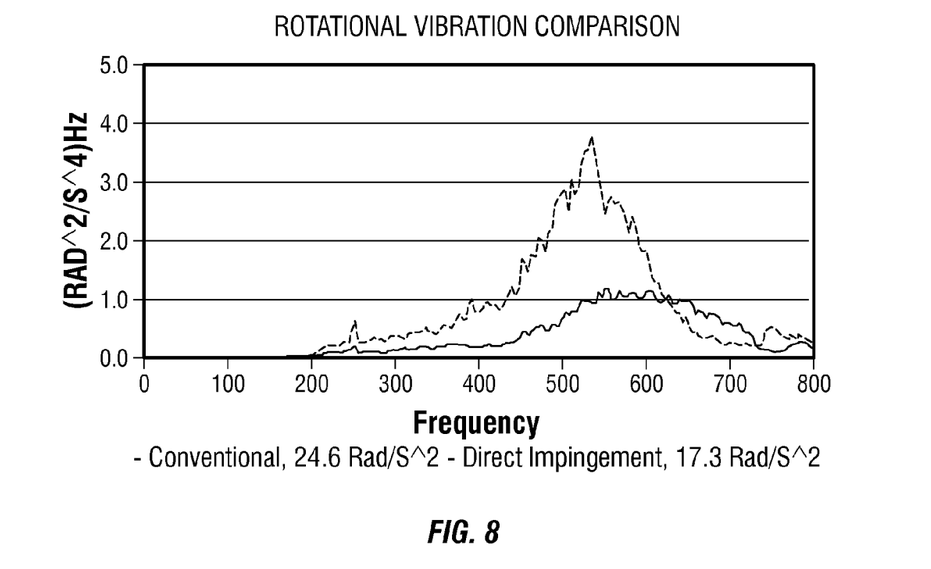
FIG. 8 is a graph comparing the rotational vibration of a flexible carrier with and without the protuberance of the present invention.

FIG. 8 is a graph comparing the rotational vibration of a flexible carrier 60 with and without the protuberance 78 of the present invention. Measuring vibration as a function of frequency using a flexible carrier without a protuberance aligned with the leaf spring resulted in the upper line with the highest peak. Under identical conditions, measuring vibration as a function of frequency using a flexible carrier with protuberances aligned with each leaf spring, as shown in FIGS. 5 through 7, resulted in the lower line having a peak that was about 60% lower than the carrier without the protuberance. This is a significant reduction of vibration and makes the difference between the hard disk drive meeting requirement and experiencing unrecoverable errors.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vibration damping carrier for a disk drive, comprising:
  a pair of flexible rails securable to mounting holes in a raised pad on opposing sides of a disk drive housing, wherein each flexible rail secures one or more sets of a spring and a protuberance in transverse alignment with the spring, each spring outwardly extending for engaging opposing walls of a chassis bay and each protuberance extending inwardly from the flexible rail into engagement with the rigid housing outside the raised pad, wherein positioning of the disk drive housing and flexible rails within the chassis bay transversely compresses each of the one or more sets.

2. The carrier of claim 1, wherein the protuberance extends inwardly a distance that is substantially equal to the height of the raised pad.

3. The carrier of claim 1, wherein the protuberance has a substantially flat surface for engaging the rigid housing.

4. The carrier of claim 1, wherein the protuberance has an aspect ratio of height to width that is less than 0.5.

5. The carrier of claim 1, wherein the flexible rails are secured to the raised mounting holes of the rigid housing with fasteners.

6. The carrier of claim 5, wherein the springs are secured to the flexible rails by the same fasteners.

7. The carrier of claim 6, wherein the springs are leaf springs.

8. The carrier of claim 7, wherein each protuberance is aligned with the center of each leaf spring.

9. The carrier of claim 7, wherein there is a protuberance aligned with each end of the leaf spring.

10. The carrier of claim 1, wherein the pair of flexible rails are connected by a strap.

11. The carrier of claim 1, wherein each flexible rail is securely positionable within a track of the chassis bay.

12. The carrier of claim 11, wherein each flexible rail has a distal end that narrows to assist entry of the rail into the track and a proximal end with tabs at assist withdrawal of the flexible rails and disk drive housing from the chassis bay.

13. The carrier of claim 1, wherein each flexible rail includes an inwardly extendable pin receivable within one of the mounting holes.

14. The carrier of claim 1, wherein the pair of flexible rails are connected by a strap.

15. The carrier of claim 1, wherein each flexible rail is securely positionable within a track of the chassis bay, and wherein each flexible rail has a distal end that narrows to assist entry of the rail into the track and a proximal end with tabs at assist withdrawal of the flexible rails and disk drive housing from the chassis bay.

16. A vibration damping disk drive assembly, comprising:
a disk drive unit having a planar disk that rotates within the plane during operation and causes vibration within the plane, wherein the disk drive is rotationally secured to a rigid housing that extends along opposing sides of the planar disk, each of the opposing sides having a raised pad with at least one mounting hole;
a pair of flexible rails secured to the mounting holes on opposing sides of a disk drive housing, wherein each flexible rail secures one or more sets of a spring and a protuberance in transverse alignment with the spring, each spring outwardly extending for engaging opposing walls of a chassis bay and each protuberance extending inwardly from the flexible rail into engagement with the rigid housing outside the raised pad, wherein positioning of the disk drive housing and flexible rails within the chassis bay transversely compresses each of the one or more sets.

17. The carrier of claim 16, wherein the protuberance extends inwardly a distance that is substantially equal to the height of the raised pad and has a substantially flat surface for engaging the rigid housing.

18. The carrier of claim 16, wherein the springs are leaf springs.

19. The carrier of claim 18, wherein each protuberance is aligned with the center of each leaf spring.

20. The carrier of claim 18, wherein there is a protuberance aligned with each end of the leaf spring.

* * * * *